United States Patent
Kim et al.

(10) Patent No.: US 12,320,732 B2
(45) Date of Patent: Jun. 3, 2025

(54) APPARATUS AND METHOD FOR IMAGING EXAMINATION OF CELLS ON SURFACE OF LIVING TISSUE USING MOXIFLOXACIN

(71) Applicants: POSTECH Research and Business Development Foundation, Pohang-si (KR); SEOUL NATIONAL UNIVERSITY HOSPITAL, Seoul (KR); UNIVERSITY INDUSTRY FOUNDATION, YONSEI UNIVERSITY WONJU CAMPUS, Wonju-si (KR)

(72) Inventors: Ki Hean Kim, Daegu (KR); Jung Bin Lee, Pohang-si (KR); Seong Han Kim, Seoul (KR); Chang Ho Yoon, Seoul (KR); Sejung Yang, Seoul (KR)

(73) Assignees: POSTECH Research and Business Development Foundation, Pohang-si (KR); SEOUL NATIONAL UNIVERSITY HOSPITAL, Seoul (KR); UNIVERSITY INDUSTRY FOUNDATION, YONSEI UNIVERSITY WONJU CAMPUS, Wonju-si (KR)

( * ) Notice: Subject to any disclaimer, the term of this patent is extended or adjusted under 35 U.S.C. 154(b) by 435 days.

(21) Appl. No.: 17/582,018

(22) Filed: Jan. 24, 2022

(65) Prior Publication Data

US 2023/0128338 A1  Apr. 27, 2023

(30) Foreign Application Priority Data

Oct. 26, 2021 (KR) .................. 10-2021-0143196

(51) Int. Cl.
*G01N 1/30* (2006.01)
*G06T 7/00* (2017.01)

(52) U.S. Cl.
CPC .............. *G01N 1/30* (2013.01); *G06T 7/0012* (2013.01); *G01N 2001/302* (2013.01);
(Continued)

(58) Field of Classification Search
CPC ....................................................... G01N 1/30
See application file for complete search history.

(56) References Cited

U.S. PATENT DOCUMENTS

2002/0126276 A1 * 9/2002 Eriksson ............ G01N 21/6458
356/318
2005/0122579 A1 * 6/2005 Sasaki ................ G02B 21/0044
359/385

(Continued)

FOREIGN PATENT DOCUMENTS

| KR | 10-1022769 B1 | 3/2011 |
| KR | 10-1781261 B1 | 10/2017 |
| KR | 10-1898220 B1 | 9/2018 |

*Primary Examiner* — Wen W Huang
(74) *Attorney, Agent, or Firm* — Revolution IP, PLLC (57) ABSTRACT

An apparatus for imaging examination of cells on a surface of living tissue using moxifloxacin. includes: a light source emitting light towards living tissue stained with moxifloxacin; a photographing unit photographing the living tissue subjected to fluorescence excitation by the light emitted from the light source; a lens unit controlling the light emitted from the light source or a fluorescence path of moxifloxacin excited by the light; an objective lens controlling a focus of the photographing unit; an active lens disposed between the objective lens and the photographing unit and changing a focal position on the living tissue; and an image generator performing image processing of a cell image of the living tissue photographed by the photographing unit to generate an in-focus image, in which the entirety of the cell image is in focus.

2 Claims, 8 Drawing Sheets

(52) U.S. Cl.
CPC ............... *G06T 2207/10004* (2013.01); *G06T 2207/10056* (2013.01); *G06T 2207/10064* (2013.01); *G06T 2207/30024* (2013.01)

(56) References Cited

U.S. PATENT DOCUMENTS

| | | | |
|---|---|---|---|
| 2011/0115895 A1* | 5/2011 | Huisken | G02B 21/06 359/385 |
| 2013/0317369 A1* | 11/2013 | Bryant-Greenwood | G06T 7/0012 382/128 |
| 2015/0157210 A1* | 6/2015 | Zhang | G02B 21/0076 600/473 |
| 2016/0289729 A1* | 10/2016 | Richards | G01N 1/38 |
| 2018/0292321 A1* | 10/2018 | Fiolka | G02B 21/0032 |
| 2019/0059737 A1* | 2/2019 | Lee | A61B 1/3132 |
| 2021/0372916 A1* | 12/2021 | Zuo | G01N 15/1429 |
| 2022/0260820 A1* | 8/2022 | Kim | G02B 21/0076 |
| 2023/0152563 A1* | 5/2023 | Ueda | G03B 15/05 359/391 |
| 2024/0060121 A1* | 2/2024 | Moffitt | C12Q 1/6841 |

\* cited by examiner

FIG. 7

APPARATUS AND METHOD FOR IMAGING EXAMINATION OF CELLS ON SURFACE OF LIVING TISSUE USING MOXIFLOXACIN

FIELD

The present invention relates to an apparatus and method for imaging examination of cells on a surface of living tissue using moxifloxacin, and more particularly to an apparatus and method for imaging examination of cells on a surface of living tissue using moxifloxacin, which enable acquisition of in-focus data of the entire area of the living tissue during a period of time for which a photographing unit photographs the living tissue by allowing an active lens to change a focal position on the living tissue stained with moxifloxacin as a fluoroquinolone antibiotic agent and subjected to single photon excitation for fluorescence photographing.

BACKGROUND

Optical microscopy capable of providing high-resolution images of cells in living tissue is used in biological research, for example, in ophthalmology and dermatology examinations in clinical practice.

Fluorescence microscopy imaging using moxifloxacin is a cell unit examination method applicable to the human body and can be used as a goblet cell examination method on the surface of the conjunctiva, a cell structure examination method on the surface of the digestive organs, such as the esophagus, the large intestine, and the like.

In such an examination method through cell imaging on the surface of living tissue, since the surface of the living tissue is not flat or inclined, a moxifloxacin-based microscope adapted to photograph a target at high resolution has a low depth-of-field (DOF) and cannot provide an in-focus image in which the entire surface of the target is in focus on a single image.

In order to solve the problem of the low depth-of-field of the high-resolution microscope, an extended depth-of-field (EDOF) technique using a phase plate and the like has been developed. However, this technique is applicable only to an extended level of 100 micron or less and thus has a problem of restriction in photographing living tissue.

RELATED LITERATURE

Patent Document (Patent Document 1) Korean Patent Publication No 10-1898220 (Title of the Invention: Confocal microscope and image processing method using the same, Issue Date: Sep. 12, 2018)

SUMMARY

Embodiments of the present invention are conceived to solve such problems in the art and it is an aspect of the present invention to provide an apparatus and method for imaging examination of cells on a surface of living tissue using moxifloxacin, which enable acquisition of in-focus data of the entire area of the living tissue during a period of time for which a photographing unit photographs the living tissue by allowing an active lens to change a focal position on the living tissue stained with moxifloxacin as a fluoroquinolone antibiotic agent and subjected to single photon excitation for fluorescence photographing.

It will be understood that aspects of the present invention are not limited to the above. The above and other aspects of the present invention will become apparent to those skilled in the art from the detailed description of the following embodiments in conjunction with the accompanying drawings.

In accordance with one aspect of the present invention, there is provided an apparatus for imaging examination of cells of living tissue stained with moxifloxacin, which includes: a light source emitting light towards the living tissue; a photographing unit photographing the living tissue subjected to fluorescence excitation by the light emitted from the light source; a lens unit controlling a path of the light emitted from the light source or a path of fluorescence light emitted from the moxifloxacin excited by the light; an objective lens controlling a focus of the photographing unit; an active lens disposed between the objective lens and the photographing unit and changing a focal position on the living tissue; and an image generator performing image processing of a cell image of the living tissue photographed by the photographing unit to generate an in-focus image, in which the entirety of the cell image is in focus, wherein the active lens changes the focal position on the living tissue so as to obtain in-focus data of the entire area of the living tissue for a period of time for which the photographing unit photographs the living tissue.

The active lens may be composed of a deformable mirror.

The active lens may be composed of an electrically tunable lens.

In accordance with another aspect of the present invention, there is provided a method for imaging examination of cells of living tissue stained with moxifloxacin, which includes: an irradiation step in which a light source emits light towards the living tissue; a photographing step in which a photographing unit photographs the living tissue subjected to fluorescence excitation by the light emitted from the light source, the photographing step including a photographing start step in which the photographing unit starts to photograph the living tissue, a focal position changing step in which an active lens disposed between an objective lens and the photographing unit changes a focal position on the living tissue, and a photographing finish step in which the photographing unit finishes photographing; and an image generation step in which a cell image of the living tissue photographed by the photographing unit is subjected to image processing to generate an in-focus image, in which the entirety of the cell image is in focus, wherein, in the focal position changing step, the active lens changes the focal position on the living tissue so as to obtain in-focus data of the entire area of the living tissue for a period of time for which the photographing unit photographs the living tissue.

In the focal position changing step, the active lens may be composed of a deformable mirror.

In the focal position changing step, the active lens may be composed of an electrically tunable lens.

The apparatus and method for imaging examination of cells on a surface of living tissue using moxifloxacin according to the present invention provide the following effects.

First, the apparatus and method according to the present invention enable acquisition of in-focus data of the entire area of living tissue during a period of time for which the photographing unit photographs the living tissue through change of a focal position of the active lens on the living tissue stained with moxifloxacin as a fluoroquinolone antibiotic agent and subjected to single photon excitation for fluorescence photographing.

Secondly, the apparatus and method according to the present invention secure a depth-of-field extended to a level of several hundred microns, thereby providing an advantage of enabling efficient examination of cells even on a slanted or uneven surface of living tissue.

Thirdly, the apparatus and method according to the present invention enable acquisition of in-focus data of the entire area of the living tissue during a period of time, for which the photographing unit photographs living tissue, through change of a focal position of the active lens on the living cell in one photographing session, thereby providing enabling cell examination over a broad area on the surface of the living tissue through rapid photographing.

Fourthly, the apparatus and method according to the present invention diagnose eye lesions, such as dry eye syndrome and the like, based on the number of goblet cells in living tissue through acquisition of two-dimensional images over a broad area by rapid photographing.

It will be understood that advantageous effects of the present invention are not limited to the above, and the above and other advantageous effects of the present invention will become apparent to those skilled in the art from the detailed description of the following embodiments in conjunction with the accompanying drawings.

DRAWINGS

FIG. 3(*a*) shows a microscope image of a goblet cell of a mouse photographed by a general microscope.

FIG. 3(*b*) shows a microscope image of a goblet cell of a mouse photographed by a focal point transfer system using an active lens as a tube lens.

FIG. 3(*c*) shows a microscope image of a goblet cell of a mouse photographed by an apparatus for imaging examination of cells of living tissue using moxifloxacin according to the present invention.

FIG. 4(*a*) shows an image of a microsphere sample photographed by a general microscope.

FIG. 4(*b*) shows an image of a microsphere sample photographed by the apparatus for imaging examination of cells of living tissue using moxifloxacin according to the present invention.

FIG. 5(*a*) shows an image of a slanted target photographed by a general microscope.

FIG. 5(*b*) shows an image of a slanted target photographed by the apparatus for imaging examination of cells of living tissue using moxifloxacin according to the present invention.

DETAILED DESCRIPTION

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Like components will be denoted by like reference numerals throughout the specification.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

When an element or layer is referred to as being "on," "connected to," or "coupled to" another element or layer, it may be directly on, connected to, or coupled to the other element or layer or intervening elements or layers may be present. However, when an element or layer is referred to as being "directly on," "directly connected to," or "directly coupled to" another element or layer, there are no intervening elements or layers present. The same is applied to other expressions for describing a relationship between elements.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An apparatus for imaging examination of cells of living tissue using moxifloxacin according to the present invention serves to examine cells of living tissue stained with moxifloxacin. Hereinafter, the apparatus for imaging examination of cells of living tissue using moxifloxacin according to the present invention will be described with reference to FIG. 1 to FIG. 6.

Figure 1:
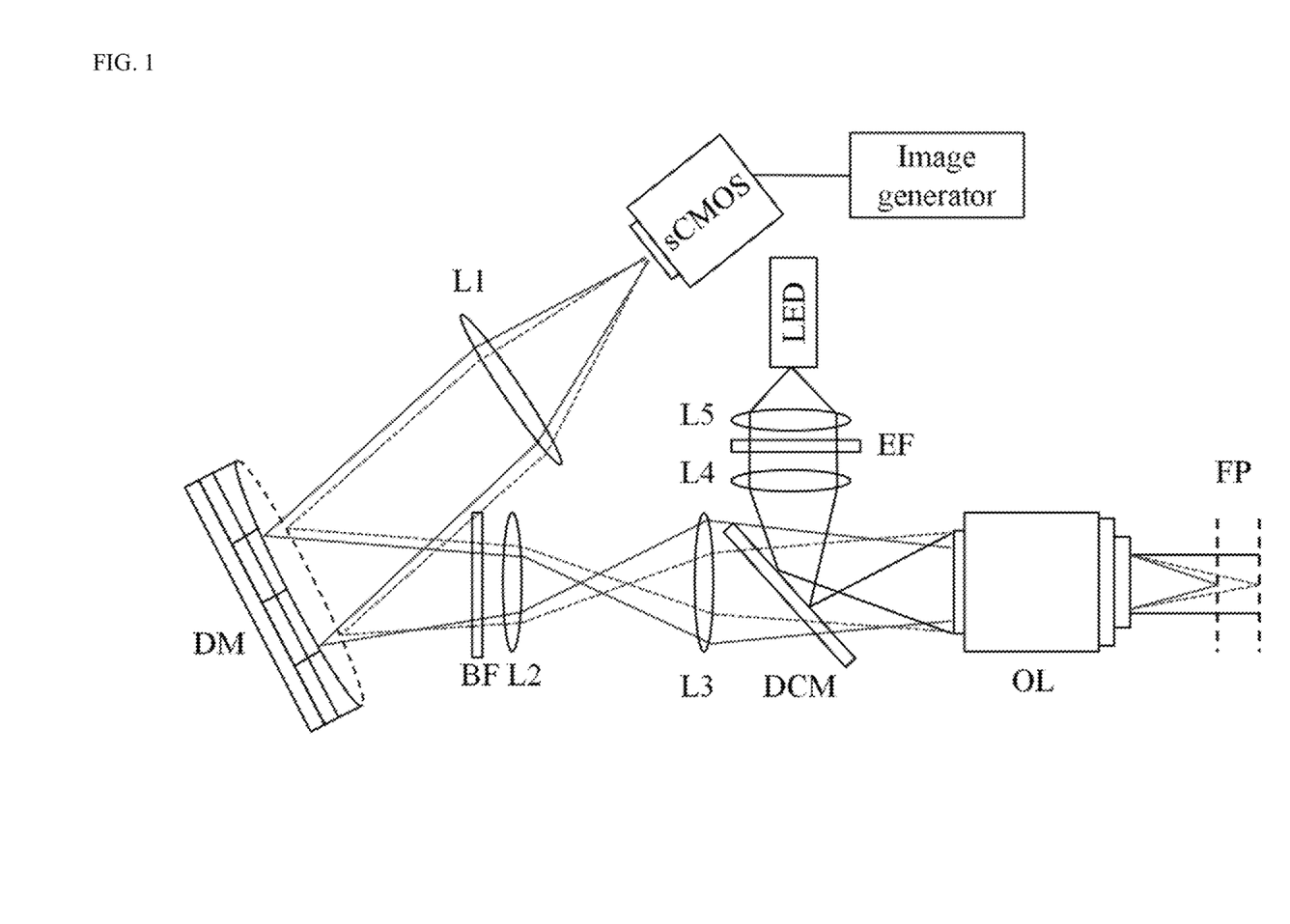
FIG. 1 is a schematic diagram of an apparatus for imaging examination of cells of living tissue using moxifloxacin according to one embodiment of the present invention.

FIG. 1 is a schematic diagram of an apparatus for imaging examination of cells of living tissue using moxifloxacin according to one embodiment of the present invention. Referring to FIG. 1, the apparatus according to the embodiment includes a light source 300, a photographing unit 100, a lens unit, an excitation filter EF, a dichroic mirror DCM, an emission filter BF, an objective lens OL, an active lens, and an image generator 200.

The light source 300 emits light towards living tissue stained with a fluoroquinolone antibiotic agent. Here, the fluoroquinolone antibiotic agent for staining the living tissue is moxifloxacin.

The light source 300 emits single photon light and an LED emitting light in the wavelength band of 365 nm to 405 nm (UVA-short visible) may be used as the light source 300 for excitation light.

The photographing unit 100 photographs the living tissue subjected to fluorescence excitation with light emitted from the light source 300.

The lens unit controls a path of the light emitted from the light source 300 or a path of fluorescent light from moxifloxacin excited by the light. Specifically, the lens unit includes first to fifth lenses L1 to L5, which will be described in detail below.

The objective lens OL controls a focal point of the photographing unit 100 and the active lens adjusts a focal position on the living tissue (FP in FIG. 1 and FIG. 2) through adjustment of the degree of focus together with the objective lens OL.

That is, the active lens is used together with the objective lens OL to change the focal position on the living tissue while scanning the living tissue at high speed such that in-focus data of the entire area of the living tissue can be obtained for a period of time for which the photographing unit 100 photographs the living tissue.

In one embodiment, the active lens is composed of a deformable mirror DM, which will be described in detail below.

The image generator 200 extracts one in-focus image through image processing of the image of the living tissue photographed by the photographing unit 100 based on the image of the living tissue photographed by the photographing unit 100.

Before description of a process of extracting the in-focus image by the image generator 200, a path of light emitted from the light source 300 and a path of excited fluorescent light from moxifloxacin used for staining the living tissue will be described.

Referring to FIG. 1, the light source 300 emits single photon light such that the light reaches the living tissue stained with moxifloxacin after passing through the fifth lens L5, the excitation filter EF, the fourth lens L4, the dichroic mirror DCM and the objective lens OL.

Here, the fourth lens L4 and the fifth lens L5 are disposed between the light source 300 and the dichroic mirror DCM such that the fifth lens L5 is disposed between the light source 300 and the excitation filter EF and the fourth lens L4 is disposed between the excitation filter EF and the dichroic mirror DCM.

The fourth lens L4 and the fifth lens L5 are provided as a pair of lenses in order to make an irradiation position of the light emitted from the light source 300 match a focal point of the objective lens OL.

The excitation filter EF allows light emitted from the light source 300 and present in a specific wavelength band to pass therethrough in order to allow an operator to observe the living tissue irradiated with the light.

The dichroic mirror DCM reflects light having passed through the fourth lens L4 towards the objective lens OL. Here, the dichroic mirror DCM may be replaced by a beam splitter.

The light having traveled along the aforementioned path reaches the living tissue and fluorescent light excited by the living tissue sequentially passes through the objective lens OL, the third lens L3, the second lens L2, the emission filter BF, the deformable mirror DM, and the first lens L1 such that the photographing unit 100 can photograph the living tissue.

The second lens L2 and the third lens L3 adjust the intensity of fluorescent light traveling towards the deformable mirror DM through the objective lens OL. That is, the second lens L2 and the third lens L3 are disposed as a pair of lenses so as to adjust the intensity of fluorescent light entering an aperture of the deformable mirror DM corresponding to the size of the aperture.

Then, the fluorescent light having passed through the emission filter BF is reflected by the deformable mirror DM, which adjusts the focal position through adjustment of the degree of focus of the fluorescent light.

When the photographing unit 100 photographs living tissue having a curved shape, a focused area (in-focus area) is changed due to height difference on the living tissue, making it difficult to photograph the entire surface of the living tissue in a single in-focus image.

In order to solve such a problem, the deformable mirror DM is disposed between the objective lens OL and the photographing unit 100 to have a depth-of-field extended to a level of several hundred microns, thereby enabling efficient examination of cells on a slanted or uneven surface of living tissue.

Here, the deformable mirror DM has dozens of actuators attached to regions of a thin and bendable mirror surface thereof and individually driven to adjust the regions of the mirror reflecting the fluorescent light to have different heights from one another.

The deformable mirror DM may be deformed into a convex lens or a concave lens by changing the shape of the mirror surface of the deformable mirror DM with reference to a neutral state, that is, a planar state, such that a focal plane of the living tissue in focus is changed among various planes of the living tissue photographed by the photographing unit 100.

Here, for a period of time for which the photographing unit 100 photographs the living tissue to generate a single image (for 10 ms to 30 ms (millisecond)), the deformable mirror DM scans a focal plane of the living tissue at high speed while changing the shape of the mirror surface at high speed such that the entire area of the living tissue can be photographed in focus.

That is, a period of time for which the mirror surface of the deformable mirror DM is deformed is at least 1 ms or less. Accordingly, for a period of time for which the photographing unit photographs the living tissue to generate a single image (for 10 ms to 30 ms (millisecond)), the deformable mirror DM is deformed at least 30 times or more to allow all of different areas of the living tissue to be photographed in a focused state, thereby enabling rapid scanning of the entire area of the living tissue in an in-focus state.

The first lens L1 is composed of a tube lens that serves to collect fluorescent light that is reflected by the deformable mirror DM and travels towards the photographing unit 100 composed of an image sensor.

The image generator 200 generates an in-focus image, in which the entire area of a cell image of the living tissue photographed by the photographing unit 100 is in focus, through image processing of the cell image. The following description will focus on generation of the in-focus image generated by the image generator 200.

In the cell image photographed by the photographing unit 100, in-focus data of the surface of the living tissue overlaps out-of-focus data overlapping the in-focus data, so that the entire area of the cell image is blurred with a high background signal.

The high background signal of the cell image is caused by accumulation of a point spread function upon focusing-in and focusing-out.

Accordingly, the image generator 200 removes influence of the point spread function using a deconvolution image processing method to generate an in-focus image so as to allow an operator to observe the living tissue in an in-focus state over the entire area of the cell image.

Here, the deconvolution image processing method refers to an algorithm for converting a blurred image into a clear image based on an assumption that the image is blurred due to convolution of a clear image with a specific point spread function.

That is, any form of signal damage in an image is called convolution and deconvolution is a process of removing the convolution without damaging original data. In this case, the deconvolution image processing method may be performed by a Wiener deconvolution method or a Richardson-Lucy deconvolution method.

As a result, the deformable mirror DM changes a focal position on the living tissue, thereby enabling acquisition of in-focus data of the entire area of the living tissue during a period of time for which the photographing unit 100 photographs the living tissue stained with moxifloxacin and subjected to single photon excitation for fluorescence photographing.

In addition, the apparatus according to the present invention has a depth-of-field extended to a level of several hundred microns to allow efficient examination of cells even on a slanted or uneven surface of living tissue, as compared with conventional depth-of-field microscopes, and the deformable mirror DM changes a focal position on the living cell in one photographing session so as to obtain in-focus data of the entire area of the living tissue during a period of time, for which the photographing unit 100 photographs the living tissue, thereby enabling cell examination over a broad area on the surface of the living tissue through rapid photographing.

Through the above process, a two-dimensional image of the living tissue is obtained instead of a three-dimensional image. Since the two-dimensional image requires a shorter shooting time and image generation time than the three-dimensional image, the two-dimensional image over a broad area of the living tissue can be obtained through rapid imaging, thereby enabling diagnosis of eye lesions, such as dry eye syndrome and the like, based on the number of conjunctival goblet cells in the living tissue.

Figure 2:
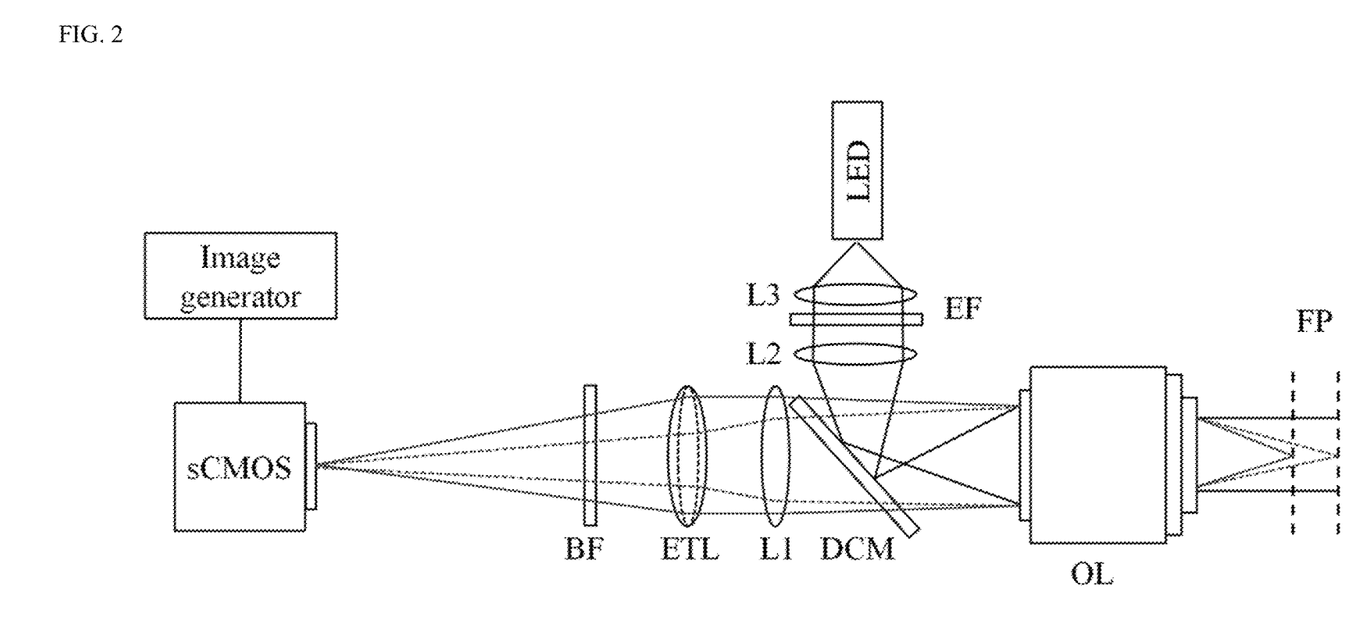
FIG. 2 is a schematic diagram of an apparatus for imaging examination of cells of living tissue using moxifloxacin according to another embodiment of the present invention.

FIG. 2 is a schematic diagram of an apparatus for imaging examination of cells of living tissue using moxifloxacin according to another embodiment of the present invention. Referring to FIG. 2, the apparatus for imaging examination of cells of living tissue using moxifloxacin according to this embodiment includes a light source 300, a photographing unit 100, a lens unit, an excitation filter EF, a dichroic mirror DCM, an emission filter BF, an objective lens OL, an active lens, and an image generator 200.

The light source 300, the photographing unit 100, the objective lens OL, the excitation filter EF, the emission filter BF, the dichroic mirror DCM and the image generator 200 are the same as the light source 300, the photographing unit 100, the objective lens OL, the excitation filter EF, the emission filter BF, the dichroic mirror DCM and the image generator 200 of the apparatus for imaging examination of cells according to the above embodiment of the invention. Thus, description of these components will be omitted.

The lens unit controls a path of light emitted from the light source 300 or a path of moxifloxacin fluorescence excited by the light. Specifically, the lens unit includes first to third lenses L1 to L3, which will be described in detail below.

The active lens is used together with the objective lens OL to change a focal position on living tissue while scanning the living tissue at high speed such that in-focus data of the entire area of the living tissue can be obtained for a period of time for which the photographing unit 100 photographs the living tissue.

Here, in the apparatus for imaging examination of cells of living tissue using moxifloxacin according to this embodiment, the active lens is composed of an electrically tunable lens ETL and will be described in detail below.

As shown in FIG. 2, the light source 300 emits single photon light such that the light reaches the living tissue stained with moxifloxacin through the third lens L3, the excitation filter EF, the second lens L2, the dichroic mirror DCM and the objective lens OL.

Here, the third lens L3 and the second lens L2 are the same as the fifth lens L5 and the fourth lens L4 of the apparatus for imaging examination of cells of living tissue using moxifloxacin according to the embodiment of the invention and description thereof will be omitted herein.

The light having traveled along the aforementioned path reaches the living tissue and fluorescent light excited by the living tissue sequentially passes through the objective lens OL, the first lens L1, the electrically tunable lens ETL and the emission filter BF such that the photographing unit 100 can photograph the living tissue.

The first lens L1 is composed of a tube lens that serves to collect the fluorescent light which travels from the objective lens OL towards the photographing unit 100 composed of an image sensor.

The fluorescent light having passed through the first lens L1 passes through the electrically tunable lens ETL, which adjusts the focal position on the living tissue through adjustment of the degree of focus of the fluorescent light.

The electrically tunable lens ETL has a variable shape realized by adopting a liquid that changes the shape of the lens into a convex shape or a concave shape upon application of predetermined electric current thereto.

Here, when electric current is continuously applied to the electrically tunable lens ETL to allow continuous change of the electrically tunable lens ETL from a convex lens shape to a concave lens shape, the shape of the electrically tunable lens ETL is changed with reference to a neutral state, that is, a plane state, such that a focal plane of the living tissue in focus is changed among various planes of the living tissue photographed by the photographing unit 100.

Here, the electrically tunable lens ETL may include one selected from among liquid crystal tunable lenses allowing variation of a focal plane through variation of optical characteristics upon application of an electric field, lenses allowing variation of a focal plane using a meniscus of an unmixable fluid (for example, electrically or electromechanically shaped meniscus lenses), lenses having a fluid capsule connected to a piston and allowing variation of a focal plane through deformation of the shape of fluid by application of external pressure on the capsule using the piston (for example: electromechanically shaped encapsulated-fluid lenses), lenses allowing variation of a focal plane through deformation of the shape of fluid using an external pump, an electromagnetic actuator, a dielectric elastomer, lenses allowing variation of a focal plane through deformation of the shape of fluid using an electrically deformable polymer actuator or a piezoelectric actuator, or using the zipper effect and thermal expansion of fluid (for example, hydraulic lenses), elastomer lenses formed of PVD gel (for example, an electrically deformed elastomeric lens), and lenses allowing variation of a focal plane through deformation of the shape of fluid using an external motor, static electricity, piezoelectricity, PE membranes, and the like (for example, electromechanically shaped elastomeric lenses).

Here, for a period of time for which the photographing unit 100 photographs the living tissue to generate a single image (for 10 ms to 30 ms (millisecond)), the electrically tunable lens ETL scans a focal plane of the living tissue at high speed while changing the shape of the mirror surface at high speed to such that the entire area of the living tissue can be photographed in focus.

Then, the fluorescent light reaches the photographing unit 100 through the emission filter BF.

Details of other components of the apparatus for imaging examination of cells of living tissue using moxifloxacin according to this embodiment are the same as those of the apparatus for imaging examination of cells of living tissue using moxifloxacin according to the above embodiment. Thus, detailed description thereof will be omitted herein.

Figure 3A:
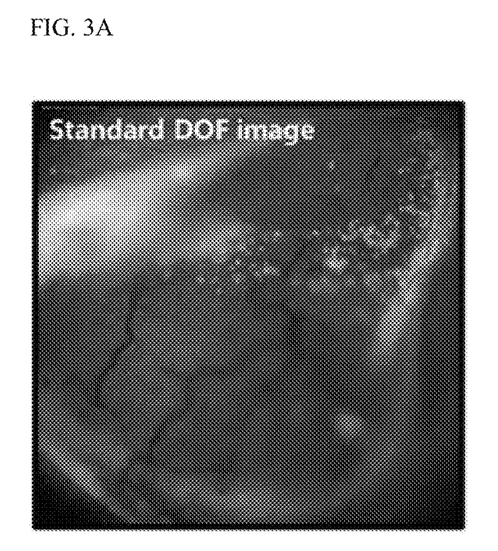
Figure 3B:
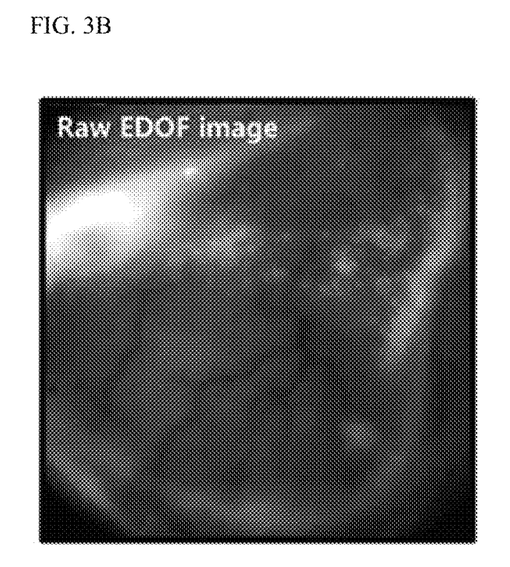
Figure 3C:
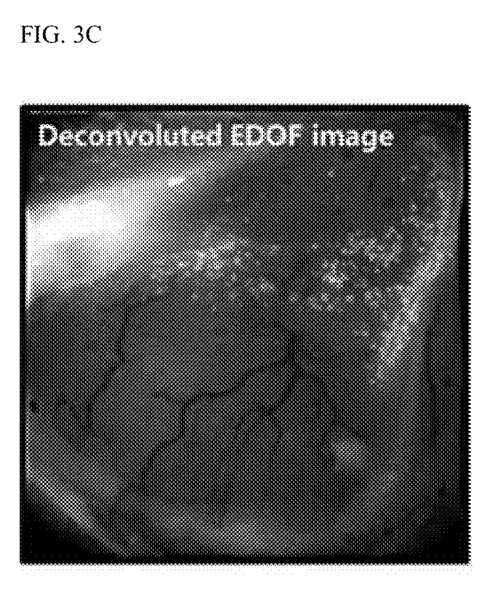

FIG. 3 shows images of goblet cells of mice stained with moxifloxacin using the apparatus for imaging examination of cells of living tissue using moxifloxacin according to the present invention and comparative examples.

FIG. 3(*a*) shows a microscope image of a goblet cell of a mouse photographed by a general microscope, in which some regions are in an in-focus state and other regions are in an out-of-focus state due to a low depth-of-field (DOF).

FIG. 3(*b*) shows a microscope image of a goblet cell of a mouse photographed by a focus transfer system using a tube lens as an active lens.

Here, it can be seen that, although it is possible to obtain in-focus data over the entire area of the image for one camera exposure session, the in-focus data overlaps out-of-focus data and the image is blurred due to a high background signal.

FIG. 3(*c*) shows a microscope image of a goblet cell of a mouse photographed by an apparatus for imaging examination of cells of living tissue using moxifloxacin according to the present invention. It could be seen that the entire area of the living tissue was in focus through deconvolution image processing of an image of the living tissue stained with moxifloxacin and photographed by the apparatus according to the present invention.

Figure 4A:
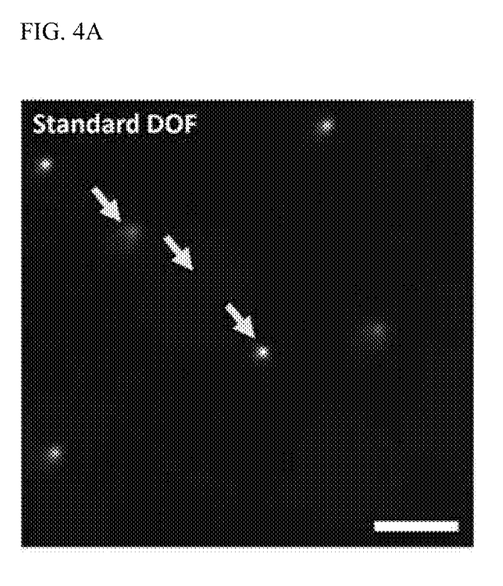
Figure 4B:
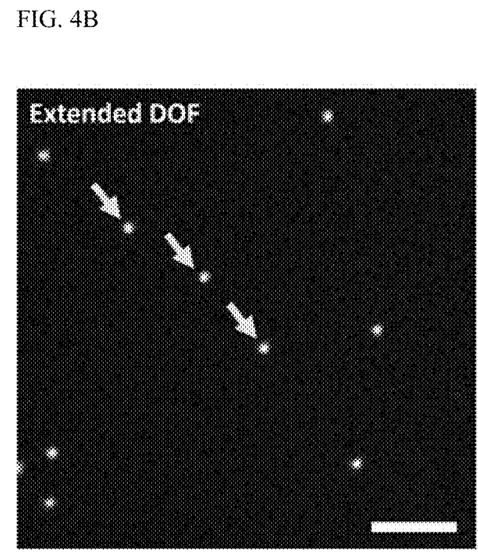

FIG. 4 shows images of microsphere samples photographed by the apparatus for imaging examination of cells of living tissue using moxifloxacin according to the present invention and comparative examples.

FIG. 4(*a*) shows an image of a microsphere sample photographed by a general microscope and FIG. 4(*b*) shows an image of a microsphere sample photographed by the apparatus for imaging examination of cells of living tissue using moxifloxacin according to the present invention. From FIG. 4, it could be seen that, as compared with a general microscope (scale bar: 20 μm, microsphere diameter: 2 μm) having a DOF level of 30 μm, the apparatus according to the present invention had a DOF extended to a level of 900 μm. In FIG. 4, each arrow indicates microspheres at the same position and it could be seen that the image of the microsphere sample photographed by the general microscope had a shallow DOF and did not show the microspheres outside the DOF range, whereas the image of microsphere sample photographed by the apparatus for imaging examination of cells according to the present invention showed microspheres in an in-focus state in all regions.

Figure 5A:
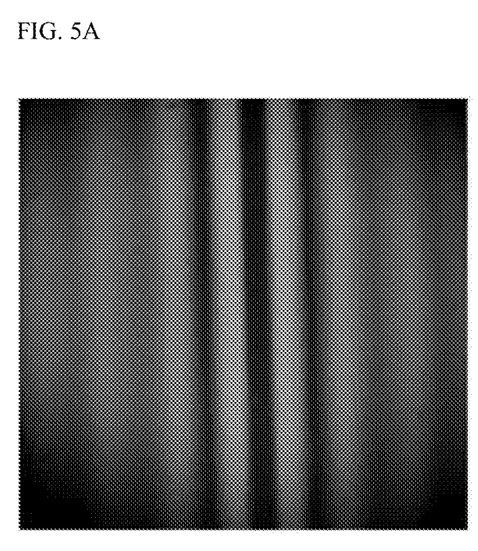
Figure 5B:
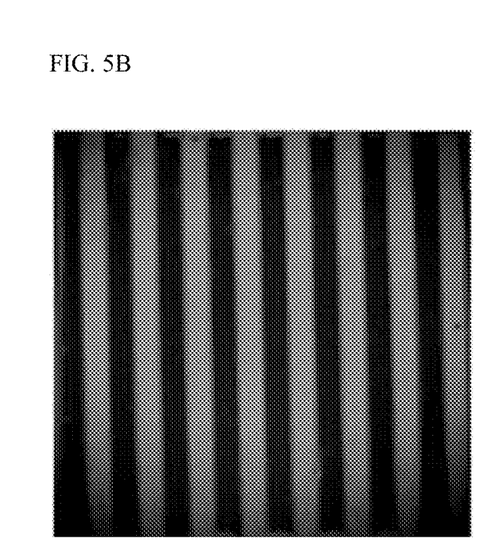

FIG. 5 shows images of slanted targets photographed by the apparatus for imaging examination of cells of living tissue using moxifloxacin according to the present invention and comparative examples.

FIG. 5(*a*) shows an image of a slanted target photographed by a general microscope and FIG. 5(*b*) shows an image of a slanted target photographed by the apparatus for imaging examination of cells of living tissue using moxifloxacin according to the present invention. It could be seen that, as compared with a general microscope having a DOF level of about 30 μm the apparatus for imaging examination of cells according to the present invention had a DOF extended to a level of 900 μm.

Figure 6:
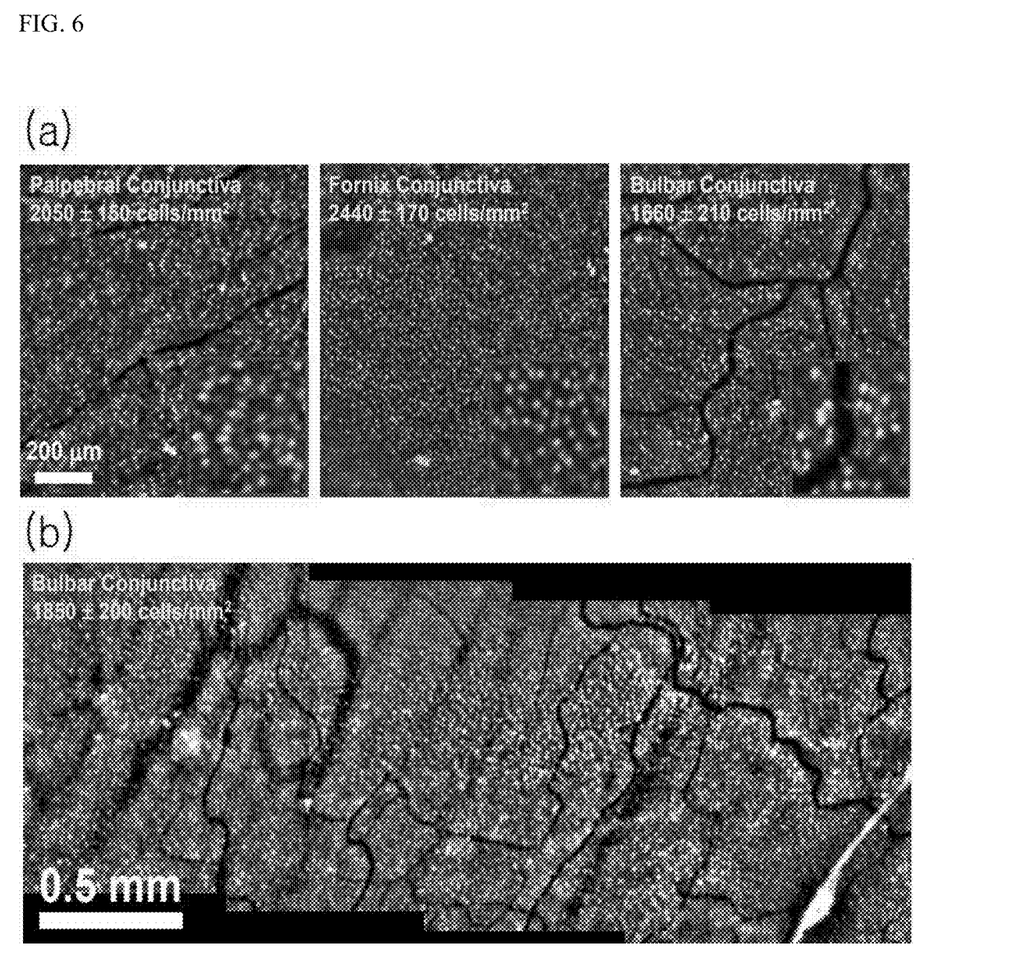
FIG. 6 shows images of ex-vivo and in-vivo rabbit conjunctival goblet cells photographed by the apparatus for imaging examination of cells of living tissue using moxifloxacin according to the present invention.

FIG. 6 shows images of ex-vivo and in-vivo rabbit conjunctival goblet cells photographed by the apparatus for imaging examination of cells of living tissue using moxifloxacin according to the present invention.

FIG. 6(*a*) shows an image of ex-vivo rabbit conjunctival goblet cells photographed by the apparatus for imaging examination of cells of living tissue using moxifloxacin according to one embodiment of the present invention and FIG. 6(*b*) shows an image of in-vivo rabbit conjunctival goblet cells photographed by the apparatus for imaging examination of cells of living tissue using moxifloxacin according to the one embodiment of the present invention.

Since rabbit eyes are similar to human eyes and are widely used in ophthalmic research, it was examined whether ex-vivo and in-vivo photographing of rabbit conjunctival goblet cells using the apparatus for imaging examination of cells according to the present invention were possible.

As shown in FIG. 6, the apparatus for imaging examination of cells of living tissue using moxifloxacin according to the embodiment of the present invention could photograph the rabbit conjunctival goblet cells under ex-vivo and in-vivo conditions. Accordingly, conjunctival goblet cells uniformly distributed in the rabbit eye conjunctiva could be identified.

Figure 7:
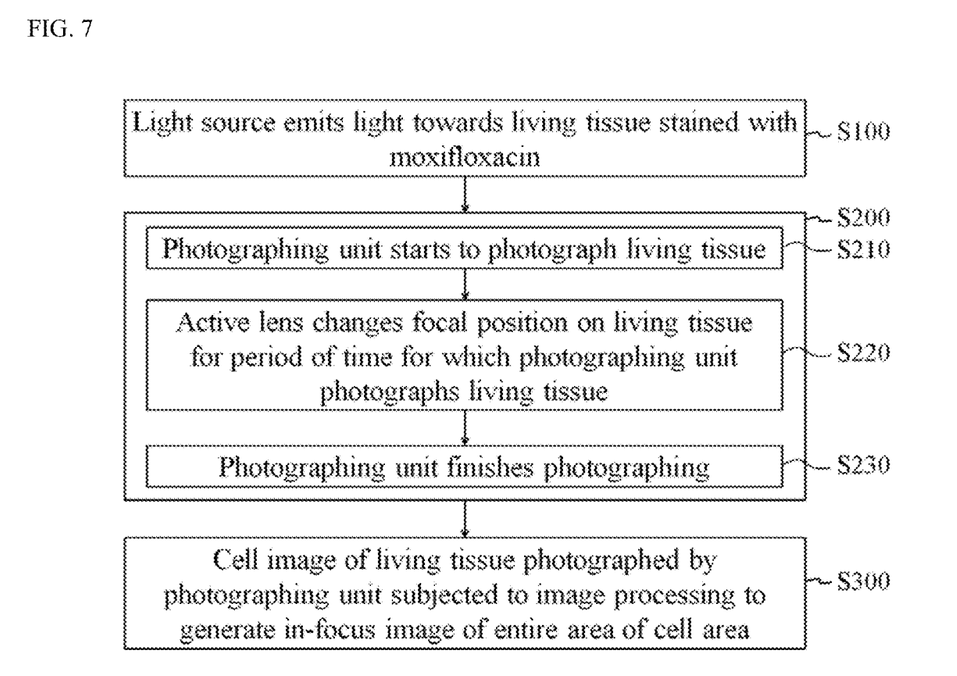
FIG. 7 is a flow diagram illustrating a method for imaging examination of cells of living tissue using moxifloxacin according to the present invention.

FIG. 7 is a flow diagram illustrating a method for imaging examination of cells of living tissue using moxifloxacin according to the present invention. Referring to FIG. 7, the method for imaging examination of cells of living tissue using moxifloxacin according to the present invention includes an irradiation step S100, a photographing step S200 and an image generation step S300 in order to examine cells of living tissue stained with moxifloxacin.

In the irradiation step S100, the light source emits light towards the living tissue stained with moxifloxacin.

In the photographing step S200, the living tissue excited by the light emitted from the light source is photographed by the photographing unit. Specifically, the photographing step S200 includes a photographing start step S210, a focal position changing step S220 and a photographing finish step S230.

In the photographing start step S210, the photographing unit starts to photograph the living tissue.

In the focal position changing step S220, the active lens changes a focal position on the living tissue for a period of time for which the photographing unit photographs the living tissue.

In the photographing finish step S230, the photographing unit finishes photographing.

That is, the focal position changing step S220 is carried out in a period of time between photographing start of the photographing unit and photographing finish thereof, and the active lens changes a focal position on the living tissue so as to obtain in-focus data over the entire area of the living tissue for a period of time for which the photographing unit photographs the living tissue.

Then, in the image generation step S300, a cell image of the living tissue photographed by the photographing unit is subjected to image processing by the image generator 200 to generate an in-focus image of the entire area of the cell area.

Details of other features of the method for imaging examination of cells of living tissue using moxifloxacin according to the present invention correspond to the apparatus for imaging examination of cells of living tissue using moxifloxacin according to the present invention described above and description thereof is omitted herein.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. In addition, these modifications and the like are not to be regarded as a departure from the spirit and prospect of the present invention.

LIST OF REFERENCE NUMERALS

100: Photographing unit
200: Image generator
300: Light source
L1: First lens
L2: Second lens
L3: Third lens
L4: Fourth lens
L5: Fifth lens
OL: Objective lens
EF: Excitation filter
BF: Emission filter
DCM: Dichroic mirror
DM: Deformable mirror
ETL: Electrically tunable lens

What is claimed is:

1. An apparatus for imaging examination of cells of living tissue stained with moxifloxacin, comprising:
   a light source emitting light towards the living tissue;
   a single photographing unit photographing the living tissue subjected to fluorescence excitation by the light emitted from the light source;
   a lens unit controlling a path of the light emitted from the light source or a path of fluorescence light emitted from moxifloxacin excited by the light;
   an objective lens controlling a focus of the photographing unit;
   an active lens disposed between the objective lens and the photographing unit, wherein the active lens is composed of one selected from
      a deformable mirror having multiple actuators attached to regions of a thin and bendable mirror surface and individually driven to adjust regions of the mirror reflecting the florescence light to have different heights from one another, wherein the deformable mirror changes a shape of the deformable mirror from a planar neutral state to convex or concave lens shapes of the deformable mirror to change a focal position on the living tissue at least 30 times during a single camera exposure session of 10 to 30 ms, and
      an electrically tunable lens having a shape realized by adopting a liquid that changes into convex or concave lens shapes of the electrically tunable lens upon application of a predetermined electric current thereto, wherein the electrically tunable lens continuously changes from the convex lens shape to the concave lens shape to change the focal position on the living tissue during the single camera exposure session of 10 to 30 ms
   an image generator performing image processing of a cell image of the living tissue photographed by the photographing unit to generate a two-dimensional in-focus image, in which the entirety of the cell image is in focus,
   wherein the photographed cell image includes out-of-focus data overlapping with the in-focus data, resulting in a high background signal due to accumulation of a point spread function upon focusing-in and focusing-out,
   wherein the image generator generates the two-dimensional in-focus image by removing influence of the point spread function using a deconvolution image processing method, thereby enabling to observe the living tissue in an in-focus state over the entirety of the cell image.

2. A method for imaging examination of cells of living tissue stained with moxifloxacin, comprising:
   an irradiation step in which a light source emits light towards the living tissue;
   a photographing step in which a single photographing unit photographs the living tissue subjected to fluorescence excitation by the light emitted from the light source, the photographing step comprising:
      a photographing start step in which the single photographing unit starts to photograph the living tissue;
      a focal position changing step in which an active lens disposed between an objective lens and the single photographing unit changes a focal position on the living tissue; and
      a photographing finish step in which the single photographing unit finishes photographing; and
   an image generation step in which a cell image of the living tissue photographed by the single photographing unit is subjected to image processing to generate a two-dimensional in-focus image, in which the entirety of the cell image is in focus,
   wherein, in the focal position changing step, the active lens is composed of one selected from
      a deformable mirror having triple actuators attached to regions of a thin and bendable mirror surface and individually driven to adjust the regions of the mirror reflecting the fluorescence light to have different heights from one another, wherein the deformable mirror changes a shape of the deformable mirror from a planar neutral state to convex or concave lens shapes to change the focal position on the living tissue at least 30 times during a single camera exposure session of 10 to 30 ms, and
      an electrically tunable lens having a shape realized by adopting a liquid that changes into convex or concave lens shapes of the electrically tunable lens upon application of a predetermined electric current thereto, wherein the electrically tunable lens continuously changes from the convex lens shape to the concave lens shape to change the focal position on the living tissue during the single camera exposure session of 10 to 30 ms,
   wherein the photographed cell image includes out-of-focus data overlapping with the in-focus data, resulting in a high background signal due to accumulation of a point spread function upon focusing-in and focusing-out,
   wherein the image generation step generates the two-dimensional in-focus image by removing influence of the point spread function using a deconvolution image processing method, thereby enabling to observe the living tissue in an in-focus state over the entirety of the cell image.

* * * * *